Figure 1:
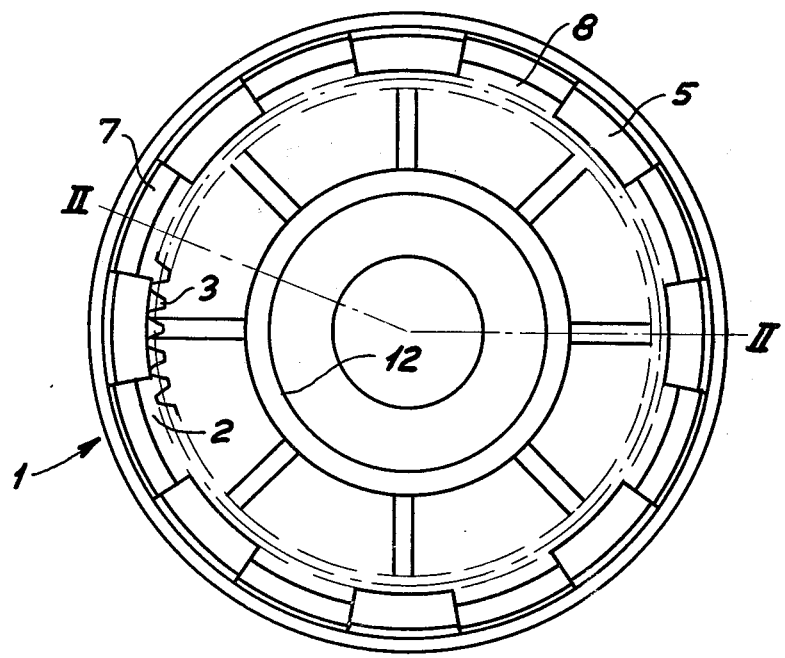

United States Patent [19]
Kirkegaard

[11] 3,929,028
[45] Dec. 30, 1975

[54] GEARWHEEL
[75] Inventor: John Kirk Kirkegaard, Holte, Denmark
[73] Assignee: John Kirkegaard Maskinfabrik A/S, Hvidovre, Denmark
[22] Filed: Apr. 16, 1974
[21] Appl. No.: 461,342

[30] Foreign Application Priority Data
Apr. 17, 1973 Denmark............................ 2102/73

[52] U.S. Cl. ............................. 74/448; 74/243 DR
[51] Int. Cl.² .................... F16H 55/12; F16H 55/30
[58] Field of Search ............... 74/448, 449, 243 DR

[56] References Cited
UNITED STATES PATENTS
| | | | |
|---|---|---|---|
| 2,707,884 | 5/1955 | Boisvert............................... | 74/448 |
| 3,069,922 | 12/1962 | Harvey............................. | 74/448 X |
| 3,220,273 | 11/1965 | Christian........................... | 74/448 X |
| 3,472,090 | 10/1969 | Dawe............................... | 74/448 X |

*Primary Examiner*—Leonard H. Gerin
*Attorney, Agent, or Firm*—Fleit & Jacobson

[57] ABSTRACT

There is provided a composite gear wheel comprising a cylindrical lining which can be secured in a housing by a simple press-fit procedure.

3 Claims, 4 Drawing Figures

U.S. Patent   Dec. 30, 1975   Sheet 1 of 2   3,929,028

GEARWHEEL

This invention relates to a gearwheel comprising a cylindrical lining, preferably of a plastic material, with an internal toothing and retained within a cylinder, preferably of metal, the inner diameter of which is equal to the outer diameter of the lining.

The specification of Danish Patent application No. 2211/72 describes a drum motor whose drum is mounted at one end on a gear rim which is the last link of a wheel gearing comprising two sets of planet gears. To secure noiseless operation of the drum motor it is desirable that the wheels of the gearing, including also the said gear rim, should be made of a plastic material. Besides, gears of plastics are much cheaper in production than steel gears and they require no lubrication.

But it is difficult to cast large plastic objects on account of temperature stresses, and the drum of a drum motor is therefore preferably made of metal. And if the said gear rim is made of plastics it will be difficult to secure the drum on the rim (normally done by gluing) because the heat expansion coefficient of plastics is approximately ten times that of steel.

This had led to the idea of using two different materials for the said gear rim or gear wheel of the type referred to in the opening paragraph, so that the outer cylinger, which is preferably of metal, can be secured within the drum without encountering the said difficulties of mounting, while the cylindrical lining with internal toothing is preferably of plastics.

It is the object of the invention to provide a gearwheel consisting of two such different materials and the two members of which, the lining and the cylinder, can be secured to each other by a simple assembly procedure, and the lining of which, being preferably of plastics, is readily castable, so that it can be extracted from the casting mould without burrs or projections impeding the removal.

This object has been accomplished by a lining which at one side and spaced along the periphery is provided with a plurality of projections extending beyond the teeth in axial direction and outwardly of the cylindrical section of the lining, the diameter of which is gradually increasing over the last axial section preceding the projections, and by a cylinder which is provided with axial projections at the same side as the lining, each of the same peripheral extension as the interspaces in the lining, the inner diameter of the cylinder increasing gradually over the last axial section proceding the projections so as to form an inwardly extending edge. Thus the assembly of the two members has been reduced to a mere compression after the lining has been positioned in the cylinder with the projections of the cylinder facing the spaces between the projections in the periphery of the lining.

The gradually increasing diameter of the lining forms an outwardly extending edge along the said interspaces, and in the compression procedure each of these outwardly extending edges is pressed past the inwardly extending edges of the cylinder projections, while the lower face of each projection of the lining extending outside the cylindrical section of the lining will engage the bottom of a space between two adjacent projections of the cylinder. These parts are thus locked firmly together both in axial direction and in the direction of rotation.

The above explanation and claim 1 relate to a gearwheel with internal toothing and, as described above, that wheel has been developed for use in a drum motor. In another embodiment of the invention the gearwheel comprises a cylindrical plastic sleeve with an external toothing and mounted around a metal cylinder the outer diameter of which is equal to the inner diameter of the sleeve. This sleeve is provided at one side and spaced along the periphery with a plurality of projections extending beyond the teeth in axial direction and inwardly of the cylindrical section of the sleeve, the diameter of which is gradually decreasing over the last axial section preceding the projections, while the metal cylinder is provided with axial projections at the same side as the sleeve and of the same peripheral extension as the interspaces in the sleeve, the outer diameter of the cylinder decreasing gradually over the last axial section preceding the projections so as to form an outwardly extending edge. Thus the advantages achieved here are exactly the same as described above. And although the structural designs of the two members that make up the gearwheel are exactly opposite one another, they present entirely identical locking constructions for joining two members together.

Figure 2:
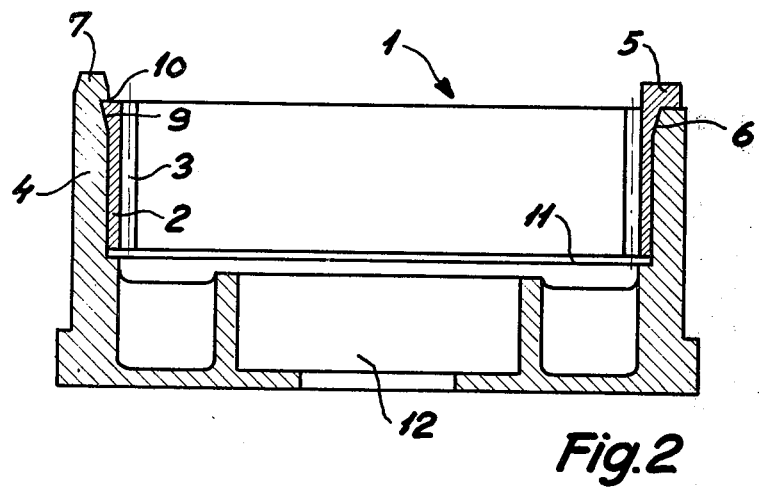
Figure 3:
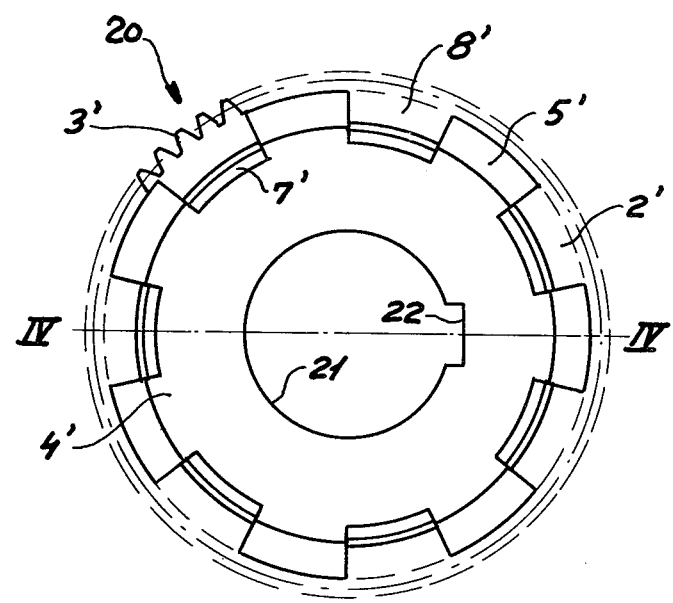
Figure 4:
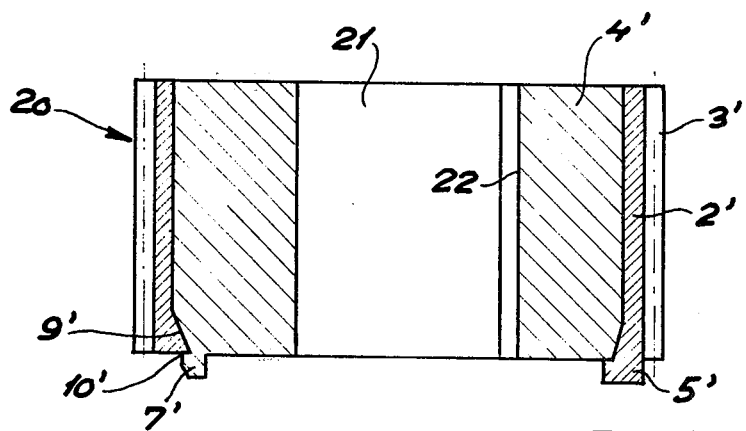

The invention will be described in greater detail below with reference to the drawing, in which FIG. 1 shown a gearwheel of the type according to the invention and as defined in claim 1, viewed from the side where the projections in the lining and cylinder are provided, FIG. 2 presents a section along the line II—II in FIG. 1, FIG. 3 shown a gearwheel of the type according to the invention and as defined in claim 2, viewed from the side where the projections in the sleeve and cylinder are provided, and FIG. 4 presents a section along the line IV—IV in FIG. 3.

FIGS. 1 and 2 show a gearwheel 1 comprising a cylindrical plastic lining 2 with an internal toothing 3 and a metal cylinder 4 the internal diameter of which is equal to the outer diameter of the plastics lining 2. The plastics lining 2 is provided at one side and with intervals 8 along the periphery with a plurality of projections 5 extending beyond the teeth 3 in axial direction and outwardly of the cylindrical section of the lining, the diameter of which is gradually increasing over the last axial section 6 preceding the projections 5.

The metal cylinder 4 is provided with axial projections 7 at the same side as the projections 5 in the lining 2, and each of these projections 7 is of the same peripheral extension as the spaces 8 in the lining 2. Moreover, the inner diameter of the metal cylinder 4 is gradually increasing over the last axial section 9 preceding the projections 7 so as to produce an inwardly extending edge 10. These edges 10 normally extend no further than to permit the cylindrical section of the lining to slid past without difficulty until the axial section 6 of the lining abuts on the inwardly extending edges 10. When the members 2 and 4 in this position are subjected to a sufficient axial pressure the increasing section 6 of the lining will be pressed past the inwardly extending edges 10, which then prevent separation of the lining and the cylinder in axial direction. At the same time the sections of the projections 5 extending beyond the cylindrical section of the lining will engage the bottom of the spaces between the projections 7 of the cylinder 4. This will limit the movement of the lining 2 into the cylinder 4. Moreover, the cylinder 4 may at the side opposite the projections be of smaller inner diameter and thus form a peripheral edge 11 for engagement of the cylindrical section of the lining. In the drawing is also indicated a housing 12 for a bearing which is not shown.

FIGS. 3 and 4 show a gearwheel 20 comprising a cylindrical sleeve 2' with external toothing 3' and a metal cylinder 4' the outer diameter of which is equal to the inner diameter of the sleeve 2'. The plastic sleeve 2' is provided at one side and with intervals 8' along the periphery with a plurality of projections 5' extending beyond the teeth 3' in axial direction and extending inwardly of the cylindrical section of the sleeve, the diameter of which is gradually decreasing over the last axial section preceding the projections 5'.

The metal cylinder 4' is provided with axial projections 7' at the same side as the projections 5' in the sleeve 2', and each of these projections 7' is of the same peripheral extension as the spaces 8' in the sleeve 2'. Moreover, the outer diameter of the metal cylinder 4' is gradually decreasing over the last axial section 9' preceding the projections 7' so as to form an outwardly extending edge 10'. These edges 10' do not normally extend further than to permit the cylindrical section of the sleeve to slide past without difficulty until the axial section 6' of the sleeve abuts on the outwardly extending edges 10'. When the members 2' and 4' in this position are subjected to a sufficient pressure the two members will automatically be locked together in the same way as the embodiment illustrated in FIGS. 1 and 2. The metal cylinder may as indicated have a cylindrical (or conical) bore 21 with a keyway 22 for mounting the gearwheel on an axle in known manner.

What I claim is:

1. A composite gear wheel comprising two concentrically engaged cylinders coterminal at one end, the inner diameter of the outer cylinder being equal to the outer diameter of the inner cylinder, the inner cylinder being provided at said one end with a first set of axially extending peripherally spaced projections which also extend in the radial direction outwardly of the inner cylinder beyond its outer cylindrical surface immediately adjacent thereto to define an outwardly extending edge engaging the end surface of the outer cylinder, the outer cylinder being provided with a second set of axially extending, peripherally spaced projections at said one end, each projection of the second set interfitting between successive projections of the first set and having a peripheral extension equal to the peripheral spacing between successive projections of the first set, the projections of said second set also extending radially inward of the outer cylinder beyond its inner cylindrical surface immediately adjacent thereto to define an inwardly extending edge engaging the end surface of the inner cylinder, one of said cylinders being composed of metal, and the other of said cylinders being composed of plastic and defining gear teeth on its cylindrical surface remote from said one cylinder.

2. A composite gear wheel of claim 1, wherein said other cylinder is the inner cylinder with the gear teeth defined on the inner cylindrical surface, the outer cylindrical surface of the inner cylinder gradually increasing in diameter over the last axial section immediately adjacent said first set of projections, and the inner surface of the outer cylinder gradually increasing in diameter over the last axial section immediately adjacent said second set of projections.

3. A composite gear wheel of claim 1 wherein said other cylinder is the outer cylinder with the gear teeth defined on the outer cylindrical surface, the inner cylindrical surface of the outer cylinder gradually decreasing in diameter over the last axial section immediately adjacent said second set of projections, and the outer surface of the inner cylinder gradually decreasing over the last axial section immediately adjacent said first set of projections.

* * * * *